United States Patent [19]

Robinson

[11] 3,999,567

[45] Dec. 28, 1976

[54] TANK TRUCK SAFETY VALVE

[75] Inventor: Bernie E. Robinson, Milwaukee, Wis.

[73] Assignee: Milwaukee Valve Company, Inc., Milwaukee, Wis.

[22] Filed: July 7, 1975

[21] Appl. No.: 593,795

[52] U.S. Cl. .......................... 137/68 R; 137/627.5; 251/144

[51] Int. Cl.² ......................................... F16K 27/03

[58] Field of Search ............... 137/61, 68 R, 627.5; 251/144

[56] References Cited

UNITED STATES PATENTS

| | | | |
|---|---|---|---|
| 2,793,653 | 5/1957 | Payne | 137/627.5 X |
| 3,665,946 | 5/1972 | Robinson | 137/68 R |

*Primary Examiner*—Robert G. Nilson
*Attorney, Agent, or Firm*—Michael, Best & Friedrich

[57] ABSTRACT

The valve includes an upper or inner portion housing, a first spring which acts on the top of a valve member and normally urges it into sealing engagement with a seat, and a lower or outlet portion carrying an actuator pin having an inner end which disengageably abuts the underside of the valve member and is actuated to lift the valve member against the biasing force of the first spring. The valve actuator pin has a vent passage extending from its inner end to atmosphere. When the actuator pin is actuated to open the valve, the valve member covers the inlet of the vent passage. When the valve is closed, a smaller second spring, carried on the inner end portion of the valve actuator pin, urges the inner end of the actuator pin away from the valve member, thereby opening the vent passage inlet so that the portion of the valve body below the valve member is vented to atmosphere. This permits the discharge conduit connected to the valve to be gravity drained after the valve is closed. In the event the valve outlet portion and/or components connected thereto are struck with a hard force, such as during a collision, a groove in the discharge portion just below the valve seat breaks. This allows the outlet portion and the actuator pin to separate and fall away so that the first spring either closes the valve or maintains the valve closed and accidental drainage of the tank truck is prevented.

6 Claims, 5 Drawing Figures

U.S. Patent  Dec. 28, 1976  3,999,567
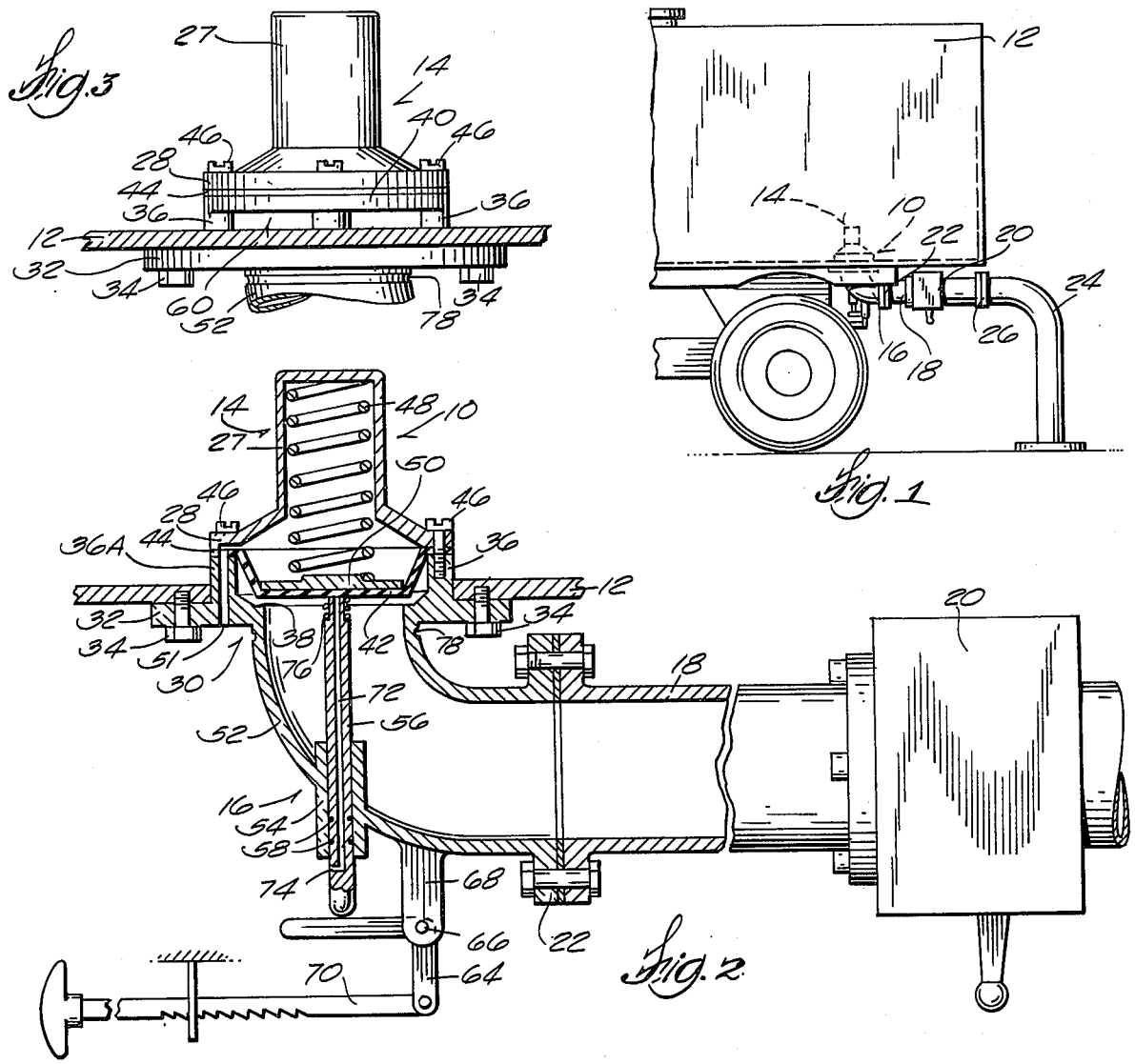
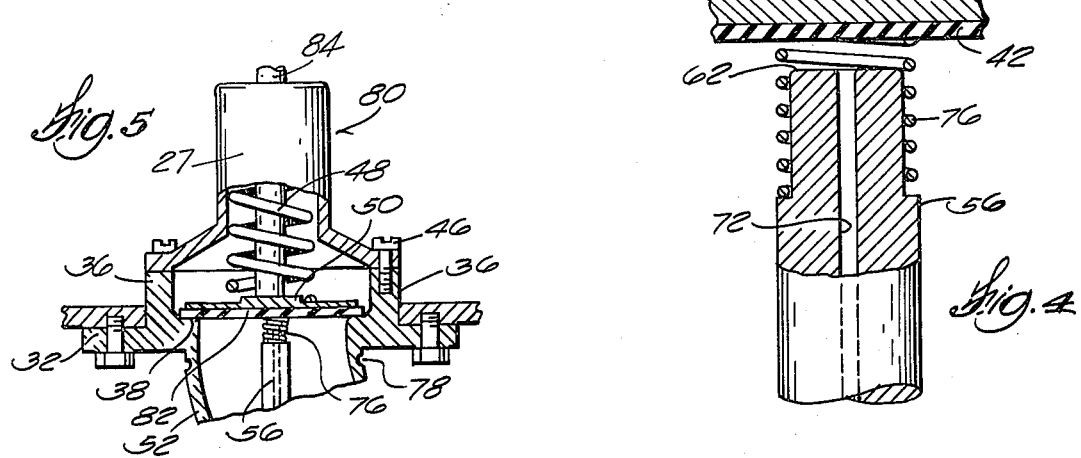

3,999,567

TANK TRUCK SAFETY VALVE

BACKGROUND OF THE INVENTION

This invention relates to safety valves for tank trucks and the like.

Tank trucks, particularly those used for transporting hazardous materials such as sulfuric acid, typically include a dump hose which is connected to a discharge conduit or manifold mounted on the bottom of the tank for unloading, and on occasion for loading, the tank. A manually operated valve, such as a gate valve or a lever-operated faucet, is located in the discharge conduit for shutting off flow of material from or into the tank. A safety valve is located in each tank compartment at the inlet to the discharge conduit as a safety measure in the event the discharge conduit is accidentally ruptured or broken away, such as during a collision. The safety valve usually is manually opened for unloading or loading, but as a rule is not designed to control flow. The shutoff valve is used for this purpose and the safety valve is closed after flow has been shut off by closing the shutoff valve. Consequently, when the tank is used for transporting the hazardous liquid, a quantity of the liquid (i.e., several gallons for larger systems) is trapped in the discharge conduit between the safety valve and the shutoff valve. Tank trucks often travel with this so-called "wet line". Needless to say, this trapped liquid represents a potential hazard in the event the discharge conduit is accidentally ruptured during a collision.

The discharge conduit can be partially drained by opening the shutoff valve after the safety valve has been closed. However, the vacuum effect created between the safety valve and the head of the liquid column, as the liquid starts to drain, prevents the discharge conduit from being completely emptied.

SUMMARY OF THE INVENTION

A principal object of the invention is to provide a safety valve for tank trucks including a simplified means for venting the discharge conduit so it can be easily and completely emptied after the safety valve is closed.

Another object of the invention is to provide such a safety valve which is arranged to automatically vent the discharge conduit upon valve closure.

A further object of the invention is to provide a venting arrangement for tank truck safety valves which can be conveniently incorporated into valves of existing constructions with minimum modifications thereto.

Other objects, aspects and advantages of the invention will become apparent after reviewing the following detailed description, the drawing and the appended claims.

The safety valve provided by the invention includes an upper or inner portion, a lower or discharge portion, a valve member normally urged into sealing engagement with a seat by a first spring housed in the inner portion, and an actuator pin carried by the discharge portion and having an inner end disengageably connected to the valve member for unseating the valve member. The actuator pin includes a vent passage extending from the inner end of the pin to the atmosphere and carries a smaller second spring, one end of which bears against the valve member. The inlet to the vent passage is covered by the valve member when it is in the open position. The second spring urges the inner end of the actuator pin away from the valve member when it is in the closed position. Thus, the portions of the valve downstream of the valve member and the discharge conduit connected thereto are automatically vented upon valve closure and thereafter can be gravity drained.

The discharge portion of the valve preferably is provided with a weakened section near the seat so that, in the event the discharge portion and/or components attached thereto is struck with a hard force, the discharge portion and the actuator pin can separate and fall away. Thus, the entire actuating mechanism separates from the valve member and there is no interference to valve closure.

BRIEF DESCRIPTION OF THE DRAWING

FIG. 1 is a fragmentary, side elevational view of a tank truck including a safety valve of the invention.

FIG. 2 is an enlarged, fragmentary view of the discharge conduit of the tank truck and a vertical cross sectional view of the safety valve shown in FIG. 1.

FIG. 3 is a fragmentary, elevational view of the safety valve positioned in the tank.

FIG. 4 is an enlarged fragmentary, partially sectioned view of the actuator pin shown in a venting position when the valve is closed.

FIG. 5 is a fragmentary view of an alternate construction for the valve member of the safety valve.

DESCRIPTION OF THE PREFERRED EMBODIMENTS

The safety valve 10 is mounted in the bottom of the tank truck 12 and includes an inner or upper portion 14 which is located inside the tank and a lower or discharge portion 16 which depends from the tank and extends rearwardly. A discharge conduit 18, including a conventional, manually operated shutoff valve, such as a lever-operated faucet 20, is connected to a flange 22 provided on the discharge portion 16. A flexible hose 24 is removably connected to the outlet of the discharge conduit 18, such as by a standard disconnect fitting 26, for unloading a hazardous liquid, such as sulfuric acid, from the tank truck 12 into an underground storage tank (not shown) as shown in FIG. 1 or for loading the tank truck from a supply tank.

Except for the venting arrangement to be described below, the basic components of the safety valve 10 preferably are arranged in substantially the same manner as the tank truck safety valve disclosed in U.S. Pat. No. 3,665,946 which patent is incorporated herein by reference. More specifically, the valve 10 has a body including an upper housing portion 27 having a radially extending flange 28 on the lower end and a base portion 30 having a radially extending mounting flange 32 permitting the valve to be removably fastened, such as by bolts 34, to the underside of the tank from the outside. The base portion 30 carries a plurality of circumferentially spaced, upstanding spacer posts 36 and has an internal annular seat 38 which faces the upper housing portion 27. An annular support ring 40 overlies the upper ends of the spacer posts 36 as best shown in FIG. 3.

Located within the valve body between the upper housing portion 27 and the base portion 30 is a generally cup-shaped, resilient diaphragm 42 including an annular, radially extending rim 44 which is sandwiched between the support ring 40 and the upper flange 28.

The upper housing portion 27 is secured to the base portion 30 by cap screws 46, each of which extends through the support ring 40 and is threaded into a respective spacer post 36. A compressed coil spring 48 disposed in the upper housing portion 27 bears against a diaphragm plate 50 located on top of the diaphragm 42 and urges the diaphragm into sealing engagement with the seat 38. With this arrangement, the diaphragm 42 serves to isolate the spring chamber from the contents of the tank, thereby protecting the spring 48 from becoming "gummed" or corroded by the tank contents and facilitating in situ cleaning of the valve when the cargo is to be changed. One of the spacer posts 36A is slightly larger and includes a vent hole 51 which is aligned with corresponding holes or passages in the support ring, the diaphragm and the upper housing portion to vent the spring cavity.

Extending from the base 30 is an outlet elbow 52 including a bushing or guide 54 for slidably receiving an elongated, valve actuator pin 56. Leakage between the guide 54 and the actuator pin 56 is prevented by one or more O-rings 58 carried by the actuator pin. The inner end 62 of the actuator pin 56 is adapted to abuttingly engage the diaphragm 42 (by moving the actuator pin inwardly) so that the diaphragm can be lifted or unseated against the biasing force of the spring 48, as shown in FIG. 2, to permit flow through the valve. When the diaphragm 42 is unseated, liquid flows from the tank into the outlet elbow 52 by flowing through the flow passages 60 defined between the spacer posts 36 (See FIG. 3) and past the seat 38.

The actuator pin 56 is actuated by a bell crank 64 pivoted at 66 on a support bracket 68 fixedly attached to the elbow 52. The bell crank 64 is actuated by a suitable means such as a rod 70, which preferably is toothed to retain the diaphragm 42 in the open position. This permits the operator to keep the safety valve open and control the flow of liquid from the tank with the shutoff valve 20.

During normal unloading or loading operations, the shutoff valve 20 is closed to shut off flow and the safety valve 10 is thereafter closed by moving the actuator pin 56 outwardly via operation of the rod 70 so that the spring 48 can urge the diaphragm 42 into sealing engagement with the seat 38. A quantity of liquid is trapped in the discharge conduit 18 between the shutoff valve 20 and the safety valve 10 during loading and during unloading when the tank is not completely emptied. Even though the shutoff valve 20 is subsequently opened, most of the trapped liquid cannot be gravity drained from the discharge conduit 18 because of the vacuum created in the upper portion of the outlet elbow 52 below the diaphragm 42.

To eliminate this problem, the actuator pin 56 is provided with a vent passage including an axially extending portion 72 having an inlet at the inner end 62 of the actuator pin 56 and a radially extending portion 74 having an outlet opening to the atmosphere. As shown in FIG. 2, the inlet to the vent passage is closed by the underside of the diaphragm 42 when the safety valve 10 is open.

Mounted on the inner end portion of the actuator pin 56 is a small coil spring 76 which disengageably bears against the underside of the diaphragm 42. The biasing force of the spring 76 acting on the underside of the diaphragm 42 is less than the biasing force of the spring 48 acting on the top of the diaphragm plate 50 so that the diaphragm is maintained in sealing engagement with the inner end of the actuator pin throughout all open positions of the valve. When the diaphragm 42 is in the closed position as shown in FIG. 4, the spring 76 urges the inner end 62 of the actuator pin 56 away from the underside of the diaphragm 42 to permit venting of the outlet elbow 52 through the vent passage in the actuator pin. With this arrangement, the high point in the discharge conduit system is automatically vented when the safety valve is closed. Thus, after the safety valve 10 has been closed, the shutoff valve 20 can be reopened and the liquid trapped in the discharge conduit can be drained by gravity.

The inner end portion of the actuator pin 56 preferably is recessed, as best shown in FIG. 4, to receive the spring 76 and the outermost diameter of the spring 76 is smaller than the inside diameter of the guide 54. This permits the actuator pin and spring assembly to be inserted through the guide from the outside, thereby simplifying assembly. Also, existing safety valves of similar construction can be easily modified to incorporate the venting feature, without removing the valve from the tank, by simply removing the existing actuator pin through the guide and replacing it with an actuator/spring assembly of the invention.

The outlet elbow 52 preferably is provided with a circumferentially extending groove 78 located just below the flange 32. The groove 78 creates a weakened section which will break in the event the outlet elbow 52, the discharge conduit 18 or the shutoff valve 20 is accidentally struck with a relatively high impact force, such as during a collision. This allows the outlet elbow 52 to separate and fall away. The diaphragm 42 is closed or maintained in a closed position by the spring 48 since the actuator pin 56 and the spring 76 are disengageably connected to the diaphragm 42 and the actuator pin is carried by the outlet elbow in the bushing or guide 54. Even if the diaphragm is held open in transit, any force causing the outlet elbow to break away cannot cause much loss of contents from the tank because the diaphragm is promptly closed by the spring 48.

In the alternate construction illustrated in FIG. 5, the valve 80 is arranged in substantially the same manner as valve 10 illustrated in FIGS. 1–4 and the same reference numerals are used for common components. Instead of being a cup-shaped diaphragm and including a rim sandwiched between portions of the valve body, the valve member 82 is in the form of a generally circular and substantially planar member which is urged into sealing engagement with the seat 38 by the spring 48 acting on the diaphragm plate 50.

Affixed to the top of the diaphragm plate 50 is a guide stem 84 which is slidably mounted in a guide (not shown) provided in the upper portion of the housing 27. With this arrangement, the spring chamber is exposed to the contents of the tank, but this is completely acceptable for many applications, such as when the tank truck is being used exclusively for transporting non-gumming and non-corroding materials. Since the spring chamber is open to the tank 12, the vent hole 51 shown in FIG. 2 is omitted.

I claim:

1. A safety valve for tank trucks comprising
   a valve body adapted for mounting on a tank and including an inner portion to be located inside the tank and a discharge portion adapted for connection to a discharge system.
   a valve seat in said valve body generally facing said inner portion;

a valve member mounted for movement inside said valve body relative to said valve seat between an open position and a closed position in sealing engagement with said valve seat, the interior portion of said discharge portion beneath and adjacent said valve member being a high point in the discharge system;

first spring means for urging said valve member towards the closed position;

an elongated actuator pin supported by said discharge portion for selectively moving said valve member away from said valve seat to an open position or permitting said valve member to be urged to the closed position by said first spring means, said actuator pin having an inner end which is located within the interior of said discharge portion, is disengageably connected with said valve member and has an outer end portion extending externally of said discharge portion;

a vent passage in said actuator pin extending from a first opening in said outer end portion communicating with the atmosphere and a second opening in said inner end communicable with the interior of said discharge portion, said second opening being closed by said valve member when said valve member is in the open position; and second spring means supported on said actuator pin with one end acting against said valve member for urging said actuator pin away from said valve member, when said valve member is in the closed position, whereby said discharge portion is vented to atmosphere via said vent passage and said discharge portion and the discharge system can be drained by gravity after said valve member is closed.

2. A safety valve according to claim 1 including a weakened section in said discharge portion and spaced from said valve seat for permitting the portion of said discharge portion supporting said actuator pin to break away from the remainder of said valve in the event a predetermined force is applied to said discharge portion, thereby allowing said valve member to close or remain closed as said separated discharge portion and said actuator pin fall away.

3. A safety valve according to claim 2 wherein said second spring means is a coil spring; and said actuator pin includes a main body and a recessed inner end portion extending from said body for receiving said coil spring.

4. A safety valve according to claim 3 wherein the main portion of said actuator pin has a substantially constant cross section; and the radially outermost dimension of said coil spring is no greater than the radially outermost dimension of the main body of said actuator pin.

5. A safety valve according to claim 4 wherein said valve member is a generally cup-shaped diaphragm and includes an annular, radially extending lip sandwiched between said valve body portions so as to cooperate with said upper portion to define the chamber in which said first spring means is disposed.

6. A safety valve according to claim 4 wherein said valve member is generally circular and substantially planar.

* * * * *